(12) United States Patent
Charpentier

(10) Patent No.: US 10,583,876 B2
(45) Date of Patent: Mar. 10, 2020

(54) DEVICE FOR FIXING AN AIR-GUIDING MEANS TO A MOTOR VEHICLE

(71) Applicant: Dr. Ing. h.c. F. Porsche Aktiengesellschaft, Stuttgart (DE)

(72) Inventor: Pierre Charpentier, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 68 days.

(21) Appl. No.: 15/713,767

(22) Filed: Sep. 25, 2017

(65) Prior Publication Data

US 2018/0093717 A1   Apr. 5, 2018

(30) Foreign Application Priority Data

Oct. 5, 2016   (DE) .......... 10 2016 118 889

(51) Int. Cl.
   *B62D 35/00*   (2006.01)
   *B62D 37/02*   (2006.01)

(52) U.S. Cl.
   CPC .......... *B62D 35/007* (2013.01); *B62D 37/02* (2013.01); *Y02T 10/82* (2013.01)

(58) Field of Classification Search
   CPC ........ B62D 35/007; B62D 37/02; Y02T 10/82
   USPC ....................................... 296/180.1
   See application file for complete search history.

(56) References Cited

U.S. PATENT DOCUMENTS

| 8,991,899 B2 * | 3/2015 | Wild .................... | B62D 35/007 |
| | | | 296/180.5 |
| 2007/0228771 A1 * | 10/2007 | Froeschle ............ | B62D 35/007 |
| | | | 296/180.1 |

FOREIGN PATENT DOCUMENTS

EP   2357121 A2   8/2011

* cited by examiner

*Primary Examiner* — Joseph D. Pape
*Assistant Examiner* — Dana D Ivey
(74) *Attorney, Agent, or Firm* — Leydig, Voit & Mayer, Ltd.

(57) ABSTRACT

A device for fixing an air guiding means to a motor vehicle includes an articulator including a plurality of joints configured to be pivoted relative to one another, a first of the plurality of joints configured to be connected to the air guiding means, wherein the first joint is translationally displaceable relative to a second of the plurality of joints.

8 Claims, 2 Drawing Sheets

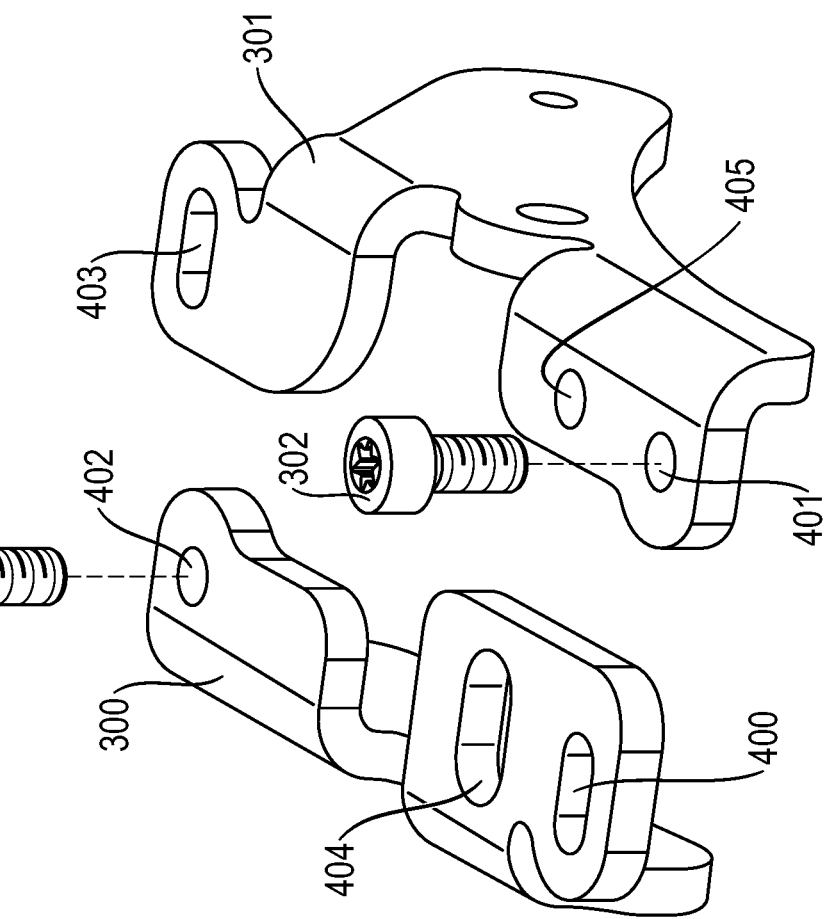
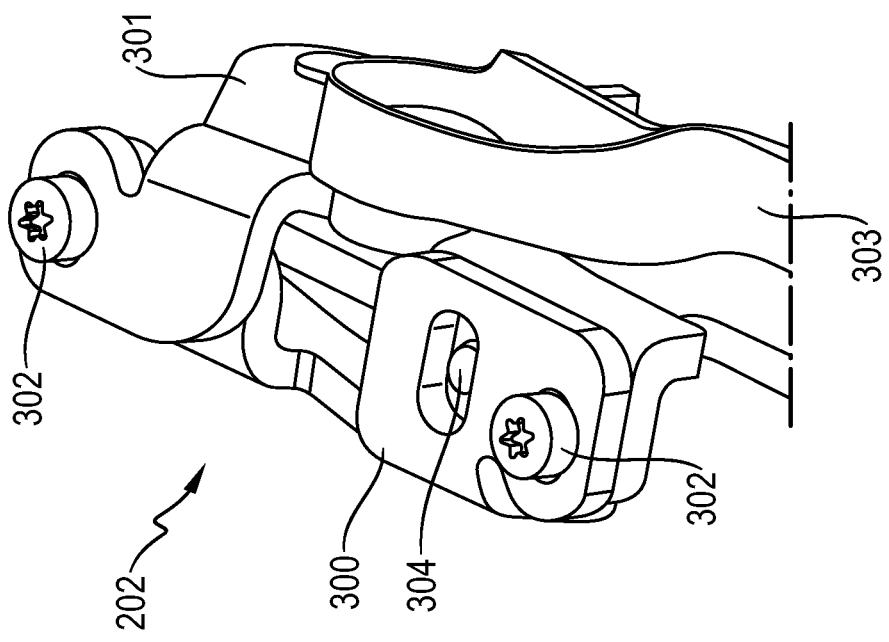

DEVICE FOR FIXING AN AIR-GUIDING MEANS TO A MOTOR VEHICLE

CROSS REFERENCE TO RELATED APPLICATIONS

This application claims benefit to German Patent Application No. DE 10 2016 118 889.1, filed Oct. 5, 2016, which is hereby incorporated by reference herein.

FIELD

The invention relates to a device for fixing an air-guiding means to a motor vehicle.

BACKGROUND

Air-guiding means are frequently also designated as spoilers and are used to improve the driving stability by means of the specific diversion of airflows. Air-guiding means that can be folded out and in are known from the prior art. In these, the problem often arises that, for an attractive appearance and fault-free function, production-induced tolerances have to be compensated.

EP 2 357 121 A2 discloses an air-guiding device having a spoiler element which can be displaced by means of an actuating mechanism between a retracted rest position and an erected operating position. The actuating mechanism has a link unit which comprises two guide links and a drive link unit. The guide links form a pivotable multi joint unit and are each attached on one side to a base and on the other side to a spoiler element support. The spoiler element support is rigidly connected to the spoiler element. The drive link unit comprises two partial links connected to each other via a joint, of which one is attached to the spoiler element support or to one of the guide links and the other is attached to the base and is connected to a drive device. The link unit comprises a tolerance compensating device which, in the retracted rest position of the spoiler element, is effective with regard to the lifting and/or angular position of the spoiler element with respect to the base.

SUMMARY

In an embodiment, the present invention provides a device for fixing an air guiding means to a motor vehicle. The device includes an articulator including a plurality of joints configured to be pivoted relative to one another, a first of the plurality of joints configured to be connected to the air guiding means, wherein the first joint is translationally displaceable relative to a second of the plurality of joints.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows a detailed view of the extract identified by A in FIG. 2; and

FIG. 4 shows a schematic perspective view of two joint elements and two connecting elements.

DETAILED DESCRIPTION

Figure 1:
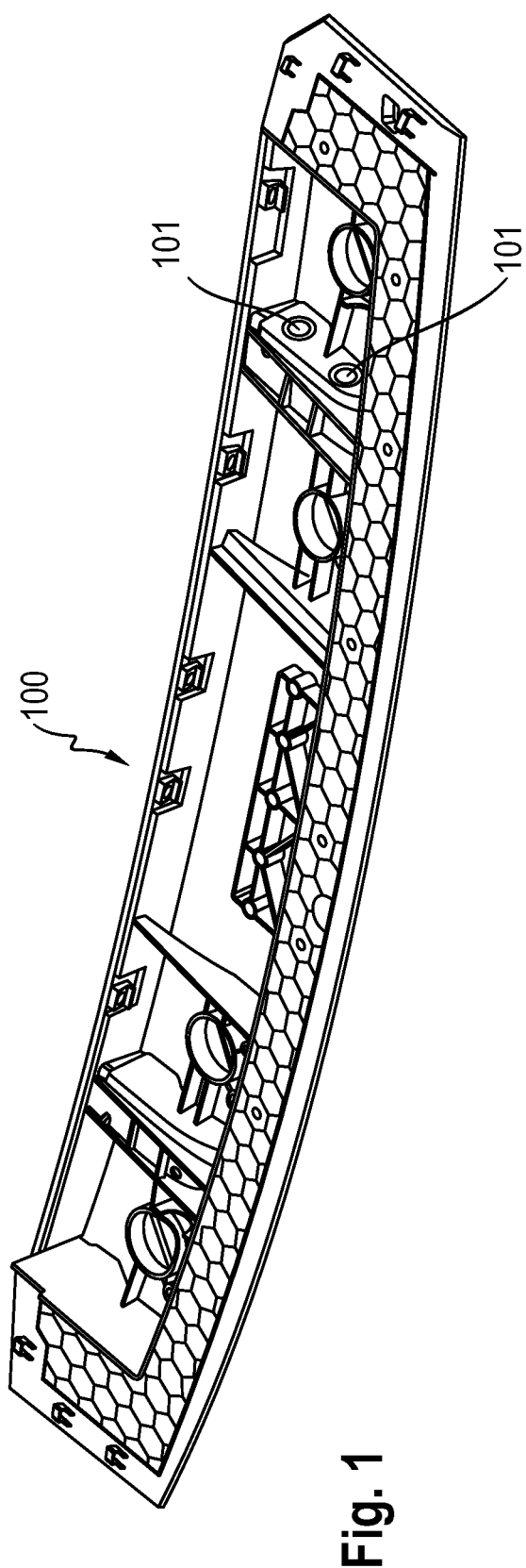
FIG. 1 shows a schematic perspective view of an air-guiding means.

An aspect of the invention provides a device with simple construction that permits tolerance compensation both in the lowered and in the raised state of the air-guiding means. In addition, an aspect of the invention provides a motor vehicle having such a device. The air-guiding means described herein can be, e.g., a spoiler.

The device comprises an articulation means that comprises a plurality of joint elements that can be pivoted relative to one another. Such joint elements can be, e.g., pivot joints. It is not absolutely necessary for each joint element to be pivotable relative to each other. However, each joint element can be pivotable relative to each other. A first of the joint elements can be connected to the air-guiding means. The first joint element is translationally displaceable relative to a second joint element.

The fact that two joint elements can be displaced translationally relative to each other means that component tolerances can be compensated for merely by using the articulation means. When the desired tolerance compensation has been reached, the first joint element can be fixed, so that it is no longer translationally displaceable. Since the first joint element can be connected to the air-guiding means, the air-guiding means can be arranged in the desired position.

Thus, no further components are needed in order to compensate for tolerances. As a result, the weight of the device is reduced and fewer interfaces and screw fixings are needed, which increases the stability of the device. As a result, it is in particular possible for the articulation means to consist of plastic. In addition, mounting is simplified, since relatively few components have to be mounted.

According to one embodiment of the invention, the device can be fixable to the motor vehicle. When fixed to the motor vehicle, the first joint element can be translationally displaceable in a transverse direction of the motor vehicle. Here, the transverse direction is to be understood to be the direction which extends horizontally and at right angles to the direction of travel of the motor vehicle when the motor vehicle is travelling without any steering lock.

The translational displaceability in the transverse direction of the motor vehicle is advantageous in order to compensate for component tolerances in this direction.

According to one embodiment of the invention, the first joint element can be detachably fixable to the second joint element. A detachable fixing is understood to mean in particular that the first joint element can be detached from the second joint element without any damage to or destruction of components of the device. Only when detached from the second joint element is a translational displacement of the first joint element possible. In this way, the air-guiding means that can be connected to the first joint element can be arranged in a desired position without undesired displacements occurring.

According to one embodiment of the invention, the device can comprise a first connecting element and a second connecting element. The first joint element and the second joint element each have a first cut-out and a second cut-out. The first cut-out is respectively formed as a slot and the second cut-out is respectively formed circularly. The first connecting element projects through the first cut-out in the first joint element and the second cut-out in the second joint element. The second connecting element projects through the second cut-out in the first joint element and the first cut-out in the second joint element.

According to one embodiment of the invention, the connecting elements can be formed as screws. In this way, the joint elements can be detachably fixed particularly simply to one another.

According to one embodiment of the invention, the first joint element can have a third cut-out formed as a slot and the second joint element can have a circular third cut-out. A projection of a third joint element of the joint elements projects through the third cut-out in the first joint element and the third cut-out in the second joint element. Thus, the stability of the device can be improved.

According to one embodiment of the invention, the device can comprise a base to which the articulation means can be fixed. The base can be used, for example, to fix the device to the motor vehicle. The base can also be designated as a mounting support.

According to one embodiment of the invention, a fourth joint element of the joint elements can be fixable to the base.

According to one embodiment of the invention, the articulation means can be designed to raise and lower the air-guiding means. For this purpose, the device can for example also comprise a drive means which drives the lowering and the lifting operation.

The air-guiding means 100 illustrated in FIG. 1 has cut-outs 101, to which a device according to one embodiment of the invention can be fixed in order to raise and lower the air-guiding means. In addition to the cut-outs 101 illustrated in FIG. 1, the air-guiding means 100 has still further such cut-outs in the left-hand area, but these are not illustrated in FIG. 1 because of the perspective. The air-guiding means is formed mirror-symmetrically.

Figure 2:
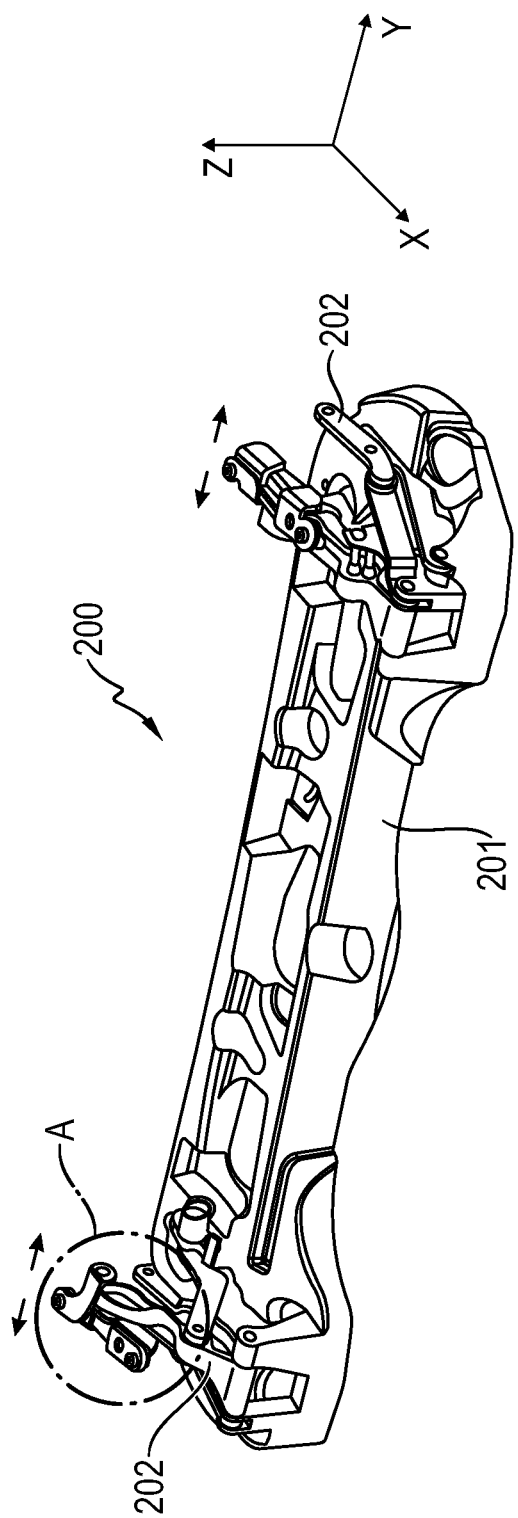
FIG. 2 shows a schematic perspective view of a device according to one embodiment of the invention.

The device 200 illustrated in FIG. 2 comprises a base 201, which can also be designated as a mounting support, and two articulation means 202 (articulator). The articulation means each comprise a plurality of joint elements (joints), of which three are illustrated more clearly in FIGS. 3 and 4. One of the joint elements can be displaced translationally relative to the remaining joint elements. This displaceability is illustrated in FIG. 2 by arrows. The joint element is displaceable in a direction which, after the air-guiding means has been fixed to a motor vehicle, extends in the transverse direction of the motor vehicle. In FIG. 2 this is the Y direction of the coordinate system shown. The air-guiding means 100 can be fixed to this joint element, so that the air-guiding means 100 can be arranged at a desired position in order to compensate for component tolerances and to reduce gap dimensions to adjacent components.

In FIG. 3, three joint elements (joints) of the articulation means 202 are illustrated on an enlarged scale. The first joint element 300 (first joint) is translationally displaceable relative to the second joint element 301 (second joint). The air-guiding means 100 can be fixed to the first joint element 300, so that it is displaceable together with the first joint The displaceability of the first joint element 300 is achieved in that both the first joint element 300 and the second joint element 301 each have a slot and a circular hole. In each case a screw 302 projects through the slot 400 in the first joint element 300 and through the circular hole 401 in the second joint element 301, and a screw 302 projects through the circular hole 402 in the first joint element 300 and through the slot 403 in the second joint element 301.

By firmly tightening the screws 302, the first joint element 300 and the second joint element 301 can be connected to each other, so that no more displacement relative to each other is possible. If the screws 302 are loosened somewhat, the first joint element 300 can be displaced translationally.

The articulation means 202 additionally has a third joint element 303 (third joint) with a projection 304. The projection 304 projects through a further slot 404 in the first joint element 300 and a further circular hole 405 in the second joint element 301. In this way, the stability of the device 200 is increased without the displaceability of the first joint element 300 being restricted.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for fixing an air-guiding means to a motor vehicle, the device comprising:
    an articulator including a plurality of joints configured to be pivoted relative to one another, and
    a first joint of the plurality of joints configured to be connected to the air guiding means,
    wherein the first joint is translationally displaceable relative to a second joint of the plurality of joints,
    wherein the device is configured to be fixed to the motor vehicle,
    wherein, when fixed to the motor vehicle, the first joint is translationally displaceable in a transverse direction of the motor vehicle, the transverse direction extending horizontally and at right angles to a forward traveling direction of the motor vehicle,
    wherein the first joint is configured to be fixed to the second joint in a detachable manner, and
    wherein a translational displacement of the first joint is possible only when detached from the second joint.

2. The device as claimed in claim 1, wherein the device comprises a base, and
    wherein the articulator is configured to be fixed to the base.

3. The device as claimed in claim 2, wherein a fourth joint of the plurality of joints is configured to be fixed to the base.

4. The device as claimed in claim 1,
    wherein the air-guiding means comprises a spoiler, and
    wherein the articulator is configured to raise and lower the spoiler.

5. A device for fixing an air-guiding means to a motor vehicle, the device comprising:
   an articulator including a plurality of joints configured to be pivoted relative to one another; and
   a first joint of the plurality of joints configured to be connected to the air guiding means,
   wherein the first joint is translationally displaceable relative to a second joint of the plurality of joints,
   wherein the first joint is configured to be fixed to the second joint in a detachable manner, and
   wherein a translational displacement of the first joint is possible only when detached from the second joint
   wherein the device comprises a first connector and a second connector,
   wherein the first joint and the second joint each have a first cut-out and a second cut-out,
   wherein each first cut-out is formed as a slot and each second cut-out is formed circularly,
   wherein the first connector projects through the first cut-out in the first joint element and the second cut-out in the second joint element, and
   wherein the second connector projects through the second cut-out in the first joint element and the first cut-out in the second joint element.

6. The device as claimed in claim 5, wherein the connectors are screws.

7. The device as claimed in claim 5, wherein the first joint has a third cut-out formed as a slot and the second joint has a circular third cut-out, and
   wherein a projection of a third joint of the plurality of joints projects through the third cut-out in the first joint and the third cut-out in the second joint.

8. A motor vehicle, comprising:
   a body;
   an air guiding means; and
   a device, fixed to the body, for fixing an air guiding means to the body of the motor vehicle, the device comprising an articulator including a plurality of joints configured to be pivoted relative to one another, a first joint of the plurality of joints configured to be connected to the air guiding means, wherein the first joint is translationally displaceable relative to a second joint of the plurality of joints,
   wherein the air-guiding means is fixed to the body via the device,
   wherein, the first joint is translationally displaceable in a transverse direction of the motor vehicle, the transverse direction extending horizontally and at right angles to a forward traveling direction of the motor vehicle,
   wherein the first joint is configured to be fixed to the second joint in a detachable manner, and
   wherein a translational displacement of the first joint is possible only when detached from the second joint.

* * * * *